W. H. BUSSEY.
EGG SHIPPING CASE.
APPLICATION FILED AUG. 18, 1919.

1,355,810. Patented Oct. 19, 1920.

Inventor
William H. Bussey
By his Attorneys

UNITED STATES PATENT OFFICE.

WILLIAM H. BUSSEY, OF MINNEAPOLIS, MINNESOTA.

EGG-SHIPPING CASE.

1,355,810.  Specification of Letters Patent.  Patented Oct. 19, 1920.

Application filed August 18, 1919. Serial No. 318,100.

*To all whom it may concern:*

Be it known that I, WILLIAM H. BUSSEY, a citizen of the United States, residing at Minneapolis, in the county of Hennepin and State of Minnesota, have invented certain new and useful Improvements in Egg-Shipping Cases: and I do hereby declare the following to be a full, clear, and exact description of the invention, such as will enable others skilled in the art to which it appertains to make and use the same.

My invention has for its object to improve the internal construction, that is, the filler of egg shipping cases, and to such ends generally stated the invention consists of the novel devices and combinations of devices hereinafter described and defined in the claims.

It is, as is well known, the custom to ship eggs in cases in the form of boxes having therein egg holding compartments afforded by a so-called filler made up of interlocking transversely intersecting partition strips usually made of heavy cardboard. The eggs are not firmly held in the several compartments of such a filler, but are usually free to rattle around and pound themselves against the sides of the compartment, thus causing breakage of soft or not very hard shells, even under careful handling.

In carrying out my invention, I employ a filler that is substantially like the customary filler, except that the filler layers are split centrally so that there is an upper and a lower filler for each layer of eggs, with the joint between the two filler sections in a horizontal plane that approximately intersects the layer of eggs centrally. In addition to this modification of the filler section, I provide, as a highly important feature, so-called hammock sheets. These hammock sheets are perforated, the perforations being formed by a multiplicity of radially disposed slits which afford egg clamping prongs that have more or less spring tensions and will engage the sides of the eggs, but will yield to adapt themselves to the various sizes of the eggs.

The invention is illustrated in the accompanying drawings, wherein like characters indicate like parts throughout the several views.

Referring to the drawings.

Figure 1:
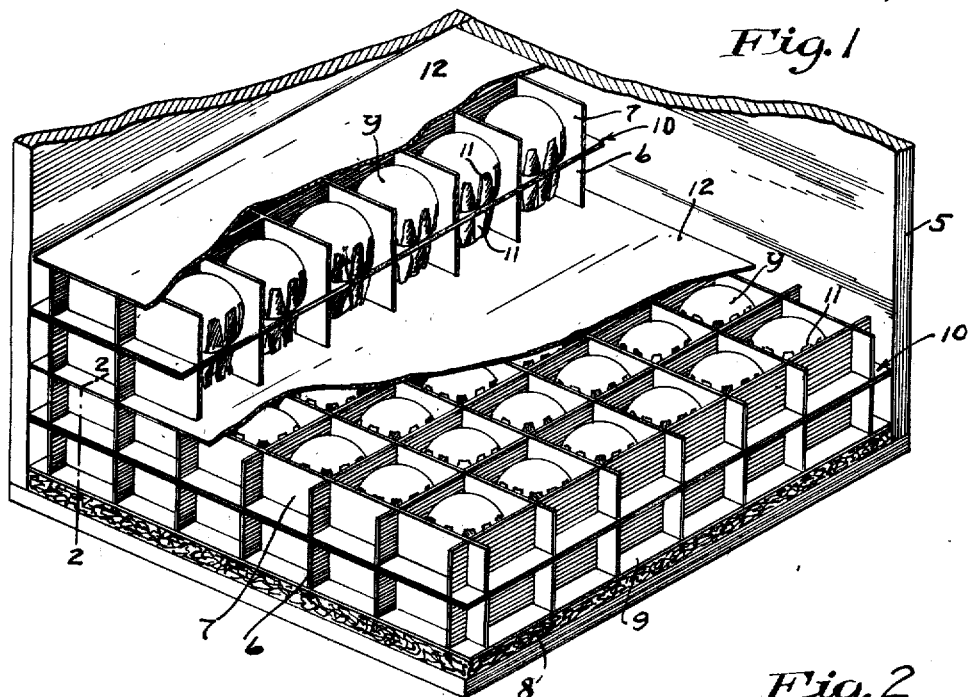
Figure 1 is a fragmentary perspective showing an egg case including the improved filler, some parts being broken away and some parts being sectioned.
Figure 3:
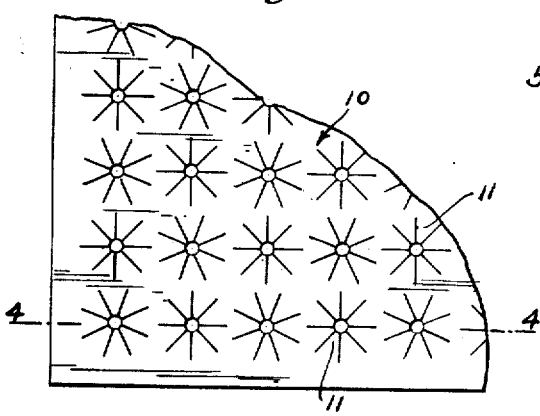
Fig. 3 is a plan view showing a portion of one of the so-called hammock plates.
Figure 4:
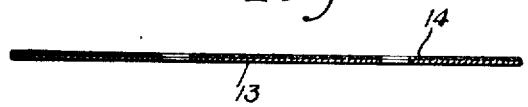
Fig. 4 is a section on the line 4—4 of Fig. 3.

The numeral 5 indicates the wooden box or outer portion of the egg case, the same being assumed to be of the usual construction. Boxes or cases of this size are usually adapted to carry 24 dozen eggs.

The case filler, as above indicated, is made up of three sections for each layer. The interlocking partitions that transversely intersect and form the lower section of the particular layer are indicated by the numeral 6 and the corresponding partitions that form the upper section of the layer are indicated by the numeral 7. These two layers 6 and 7 are of approximately the type of the ordinary partition section layers. In filling the box with eggs, a cushion 8 is preferably placed first, directly on the bottom of the box. This cushion may be covered with a cardboard piece 9 or the cardboard cover may be omitted. Next my first, or lower section of the first layer 6 is placed on top of the cushion layer, and the first hammock sheets are then applied on this lower section 6. For each layer there are two such hammock sheets and each hammock sheet 10 is formed with a multiplicity of egg passages or pockets, the said passages as already indicated, being formed by a plurality of radial lips 11. In forming these prongs, a central hole is preferably punched at the center of the pocket, so that slits that form the prongs 11 radiate from such central holes. These pockets are very closely positioned in the hammock sheets 10, and hence the slits of any one pocket extend centrally between the slits of adjacent pockets, to thereby prevent cutting through from one pocket through the other.

Figure 2:
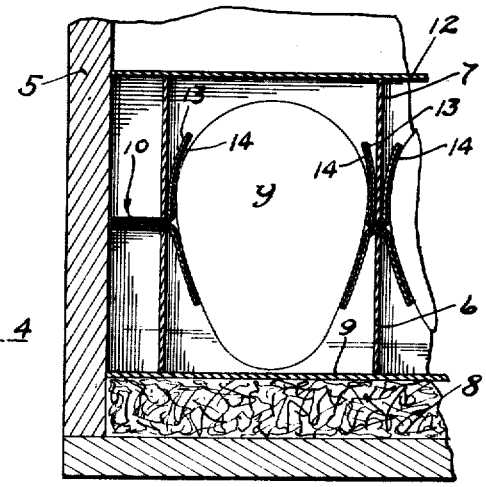
Fig. 2 is an enlarged, or approximately full sized section showing a fragment of the case section in a plane indicated by the line 2—2 on Fig. 1.

When the first hammock 8 is positioned on the lower filler section 6, as above stated, the eggs Y are inserted into the pocket and by inserting the eggs, the prongs 11 of the lower hammock sheet 8 are pressed downward as shown in Fig. 2 and will then yieldingly hold the eggs centered in the compartments.

A second hammock 8 is then placed on top of the layer of eggs and by this operation the prongs of the upper or second hammock teeth will be pressed upward so that they will grip the upper portion of the eggs, as best shown in Fig. 2. The upper filler section 7 is then placed in position on top of the marginal portion and intermediately flat portion of the upper hammock. A divider plate 12 of card board or other similar material is then placed on top of the upper filler section of the first layer. In this way, the several layers of the filler will be built up, and preferably a cushion plate, similar to the cushion plate 8 will be placed on top of the uppermost layer. By the above described arrangement, the eggs will be held in what may be treated as hammocks. Whether or not their lower ends will engage in great loads, will depend on the strength of prongs 11 of the hammock plate. At any rate, a part of the weight of the egg will be sustained by the prongs and the eggs will be centered in the compartment and will be cushioned in all directions, so that they will not jump around or pound against the walls of the compartments.

The so-called hammock plate will in some instances be made of thin sheet metal but in the drawings and as I believe, preferably I employ hammock sheets made up, each of a layer of cardboard 13 covered with a fabric, such as cheese cloth or muslin glued thereto and indicated at 14. With this two ply arrangement, the cloth 14 should be on that side away from which the prongs will be bent when engaged with the eggs. This arrangement puts the cloth in a tension and the cardboard in compression and affords strong connections between the prongs and the bodies of the sheets.

It is important to note that my invention may be applied to egg boxes or containers without reducing the holding capacity thereof as to number of eggs, or in other words, will not require larger boxes for carrying the same number of eggs. The efficiency of this improved egg crate or shipping box has been demonstrated in practice. Eggs contained in shipping cases or boxes, having my invention incorporated therein, may be safely shipped by parcel post.

What I claim is:

1. An egg shipping case including an outer box and a filler therefor, said filler comprising a plurality of layers, each layer being made up of upper and lower filler sections with alined egg compartments, and upper and lower hammock sheets placed together and inserted between the upper and lower filler sections of the layers and having reversely projecting yielding portions for engagement with the eggs.

2. An egg shipping case comprising an outer box, and a filler for said box, said filler comprising for each layer upper and lower filler sections, each filler section comprising transversely intersectioned interlocked partitions, and upper and lower hammock sheets inserted between said filler section at the intermediate portions of the layers, said hammock sheets having egg receiving pockets formed by prongs that spring in opposite directions when engaged with eggs inserted into said pockets.

3. An egg shipping case comprising an outer box, and a filler for said box, said filler comprising for each layer upper and lower filler sections, each filler section comprising transversely intersecting interlocked partitions, and upper and lower hammock sheets inserted between said filler section at the intermediate portions of the layers, said hammock sheet having egg receiving pockets formed by prongs that spring in opposite directions when engaged with eggs inserted in said pockets, a cushion plate at the bottom of the filler, and divider plates between the layers of said filler.

4. An egg shipping case comprising an outer box, and a filler for said box, said filler comprising for each layer upper and lower filler sections, each filler section comprising transversely intersectioned interlocked partitions, and upper and lower hammock sheets inserted between said filler section at the intermediate portions of the layers, said hammock sheets having egg receiving pockets formed by prongs that spring in opposite directions when engaged with eggs inserted into said pockets, said hammock sheet being formed by a layer of cardboard and a covering of fabric, said fabric being applied to the exposed surface of the cardboard.

In testimony whereof I affix my signature in presence of two witnesses.

WILLIAM H. BUSSEY.

Witnesses:
CLARA DEMAREST,
BERNICE G. BAUMANN.